United States Patent
White et al.

(10) Patent No.: US 8,752,093 B2
(45) Date of Patent: Jun. 10, 2014

(54) SYSTEM AND METHOD OF PROVIDING RECOMMENDATIONS RELATED TO A SERVICE SYSTEM

(75) Inventors: Scott White, Austin, TX (US); Ian C. Schmehl, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 500 days.

(21) Appl. No.: 12/017,087

(22) Filed: Jan. 21, 2008

(65) Prior Publication Data

US 2009/0187944 A1   Jul. 23, 2009

(51) Int. Cl.
*G06F 13/00* (2006.01)
*G06F 3/00* (2006.01)
*H04N 5/445* (2011.01)

(52) U.S. Cl.
USPC ............... 725/46; 725/34; 725/35; 725/39; 725/40; 725/44; 725/47; 725/92

(58) Field of Classification Search
USPC ......... 725/34–35, 39–47, 52–53, 68, 91, 100, 725/114, 131, 138–139, 144, 151
See application file for complete search history.

(56) References Cited

U.S. PATENT DOCUMENTS

| | | | |
|---|---|---|---|
| 5,758,257 A * | 5/1998 | Herz et al. | 725/116 |
| 7,296,284 B1 * | 11/2007 | Price et al. | 725/39 |
| 2002/0138836 A1 * | 9/2002 | Zimmerman | 725/46 |
| 2003/0093793 A1 | 5/2003 | Gutta | |
| 2004/0073915 A1 * | 4/2004 | Dureau | 725/9 |
| 2005/0144637 A1 * | 6/2005 | Shikata et al. | 725/35 |
| 2007/0028266 A1 | 2/2007 | Trajkovic et al. | |
| 2007/0050192 A1 * | 3/2007 | Gutta et al. | 705/1 |
| 2008/0092159 A1 * | 4/2008 | Dmitriev et al. | 725/34 |
| 2008/0301737 A1 * | 12/2008 | Hjelmeland Almas et al. | 725/61 |
| 2009/0006373 A1 * | 1/2009 | Chakrabarti et al. | 707/5 |
| 2009/0132459 A1 * | 5/2009 | Hicks | 706/52 |

FOREIGN PATENT DOCUMENTS

JP   2000-101941   *   4/2000

OTHER PUBLICATIONS

Translation of JP 2000-101941.*

* cited by examiner

*Primary Examiner* — Yassin Alata

(74) *Attorney, Agent, or Firm* — Akerman LLP; Michael K. Dixon; Roy P. Zachariah (57) ABSTRACT

A method of providing recommendations related to a service is disclosed and includes receiving data from a device associated with a service subscriber, the data identifying an individual. The method also includes creating a personalization profile associated with the service subscriber. The personalization profile is populated with information included in a profile of the identified individual. The method further includes providing at least one recommendation based on the personalization profile of the service subscriber.

23 Claims, 7 Drawing Sheets

SYSTEM AND METHOD OF PROVIDING RECOMMENDATIONS RELATED TO A SERVICE SYSTEM

FIELD OF THE DISCLOSURE

The present disclosure generally relates to providing recommendations related to a service.

BACKGROUND

Recommendations are provided in connection with various services, such as online retail services. Typically, recommendations are initially based on generic user profiles that are developed through questionnaires. Such profiles can produce inaccurate recommendations until sufficient historical data is collected and the profiles are tuned to reflect user activity.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
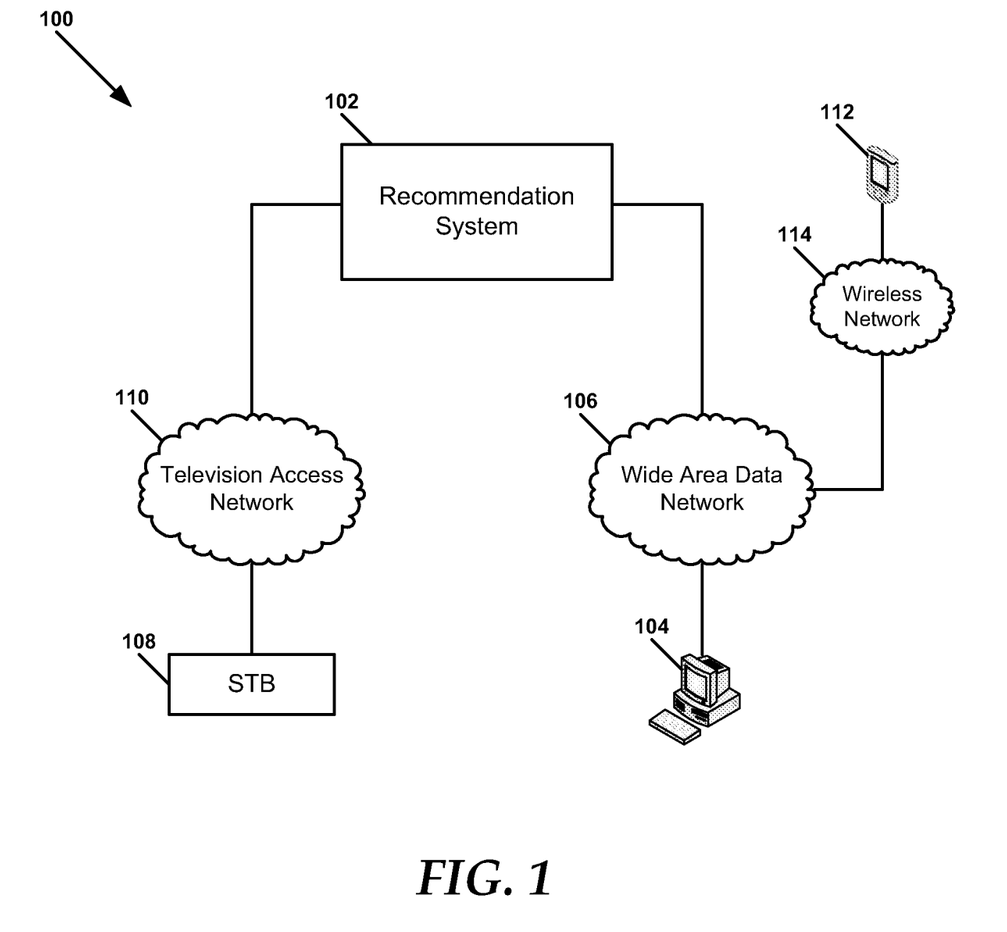
FIG. 1 is a block diagram illustrating a particular embodiment of a system to provide recommendations related to a service.

FIG. 1 illustrates a particular embodiment of a system 100 to provide recommendations related to a service. The system 100 includes a recommendation system 102 associated with a service provider, such as an online service provider, a television service provider or another service provider. The recommendation system 102 communicates with a computing device 104 associated with the service subscriber via a wide area data network 106, such as the Internet. The recommendation system 102 can also communicate with a wireless device 112 associated with the service subscriber, such as a web-enabled cellular phone, via the wide area data network 106. In an illustrative embodiment, the wireless device 112 is adapted to communicate with the wide area data network 112 via a wireless network 114. Further, the recommendation system 102 can communicate with a set-top box device 108 associated with the service subscriber via a television access network 110, such as a cable access network, a satellite network, or an Internet Protocol Television (IPTV) access network.

In some embodiments, the recommendation system 102 can communicate with one or more elements of a server system or other plurality of network elements associated with the service provider. For example, the recommendation system 102 can be included at a video head-end of a video content service provider. In another example, the recommendation system can communicate with a web server that provides a website of an online retail service provider or other online service provider. In other embodiments, the recommendation system 102 can be integrated with a network element that provides other aspects of a service. For instance, the recommendation system 102 can be integrated with a video server, a web server providing a website, or another network element related to the service.

In an illustrative embodiment, the recommendation system 102 is adapted to determine that it is to create a personalization profile for a subscriber to the service provided by the service provider. The recommendation system 102 can be adapted to create the personalization profile, for example, in response to the subscriber registering an account with the service provider; in response to the subscriber's first use or other use of the service provided by the service provider; in response to a subscriber request to reset or otherwise alter a current profile; or in response to another event associated with the subscriber. The recommendation system 102 is adapted to receive an identification of an individual, such as another subscriber, a celebrity, another real person or a fictional character, and to retrieve a profile associated with the identified individual. The profile can be retrieved from memory at the recommendation system 102 or from another source communicating with the recommendation system 102.

Further, the recommendation system 102 is adapted to create the personalization profile associated with the subscriber and to populate the profile with information included in the profile of the identified individual. Such information can include demographic information (e.g., age, income, location, etc.), personal interest information, historical information (e.g., purchasing history, television viewing history, search history, etc.), other information, or any combination thereof.

In one example, the recommendation system 102 can be adapted to provide a plurality of selectable identifications via a graphical user interface (GUI) sent to the computing device 104, the wireless device 112, or the set-top box device 108. The recommendation system 102 can be adapted to send the GUI, or the GUI can be sent by another network element communicating with the recommendation system 102, such as a web server, video server, distribution server (D-server), or other network element. The recommendation system 102 can be adapted to receive data indicating a selection of one of the plurality of selectable identifications and to create a personalization profile associated with the subscriber, where the created personalization profile is populated with information included in the profile of the identified individual.

The recommendation system 102 is adapted to provide one or more recommendations in response to interaction by the subscriber with the service provided by the service provider. For example, the recommendation system 102 can be adapted to recommend video content, music content, one or more video channels, one or more music channels, pay-per-view content, video-on-demand content, or any combination thereof, when a television service subscriber activates a set-top box device, views an electronic program guide, selects a channel, purchases pay-per-view content, performs another action with respect to a television service, or any combination thereof. In another example, the recommendation system 102 can be adapted to recommend one or more products when a subscriber to an online retail service selects, views, searches for, or purchases a product at a website operated by the online retail service provider.

In other examples, the recommendation system 102 can be adapted to recommend one or more subscriptions when a subscriber to an online subscription service selects, views, searches for, or purchases a subscription at a website operated by the online subscription service provider; to recommend one or more digital music selections when a subscriber to a digital music service selects, views, searches for, or purchases a digital music selection at a website operated by a digital music service provider; to recommend one or more movie rental offerings when a subscriber to a movie rental service selects, views, searches for, or rents a movie at a website operated by a movie rental service provider; to recommend one or more personal advertisements when a subscriber to an online matchmaking service selects, views, or searches for one or more individuals at a website operated by the matchmaking service provider; or to recommend one or more financial offerings when a subscriber or client of a financial service selects, views, searches for, or invests in a financial offering with a financial service provider.

The recommendation system 102 is adapted to generate the recommendation(s) based on the personalization profile created for the subscriber. Hence, recommendations are initially based on information obtained from the profile of the identified individual. The recommendations are sent to at least one subscriber device, such as the computing device 104, the set-top box device 108, the wireless device 112, or any combination thereof. In one example, the recommendations can be sent to the same subscriber device from which the identification of the individual was received. In other embodiments, the recommendations can be sent to a different subscriber device. For instance, the identification of the individual can be received from the computing device 104 (e.g., while the subscriber configures an account associated with a television service), whereas the recommendations can be sent to the set-top box device 108 while the subscriber is receiving video content via the television service.

In addition, the recommendation system 102 is adapted to update the personalization profile based on at least one activity of the subscriber with respect to the service. For instance, the recommendation system 102 can be adapted to update the personalization profile of an online retail service subscriber based on offerings that are viewed, not viewed, selected, not selected, purchased, not purchased, searched for, or any combination thereof, at an online retail site via the computing device 104, the set-top box device 108, the wireless device, or any combination thereof. The recommendation system 102 is adapted to provide one or more second recommendations for the subscriber based on the updated personalization profile.

The recommendation system 102 is adapted to provide additional recommendations based on further updates to the personalization profile.

Figure 2:
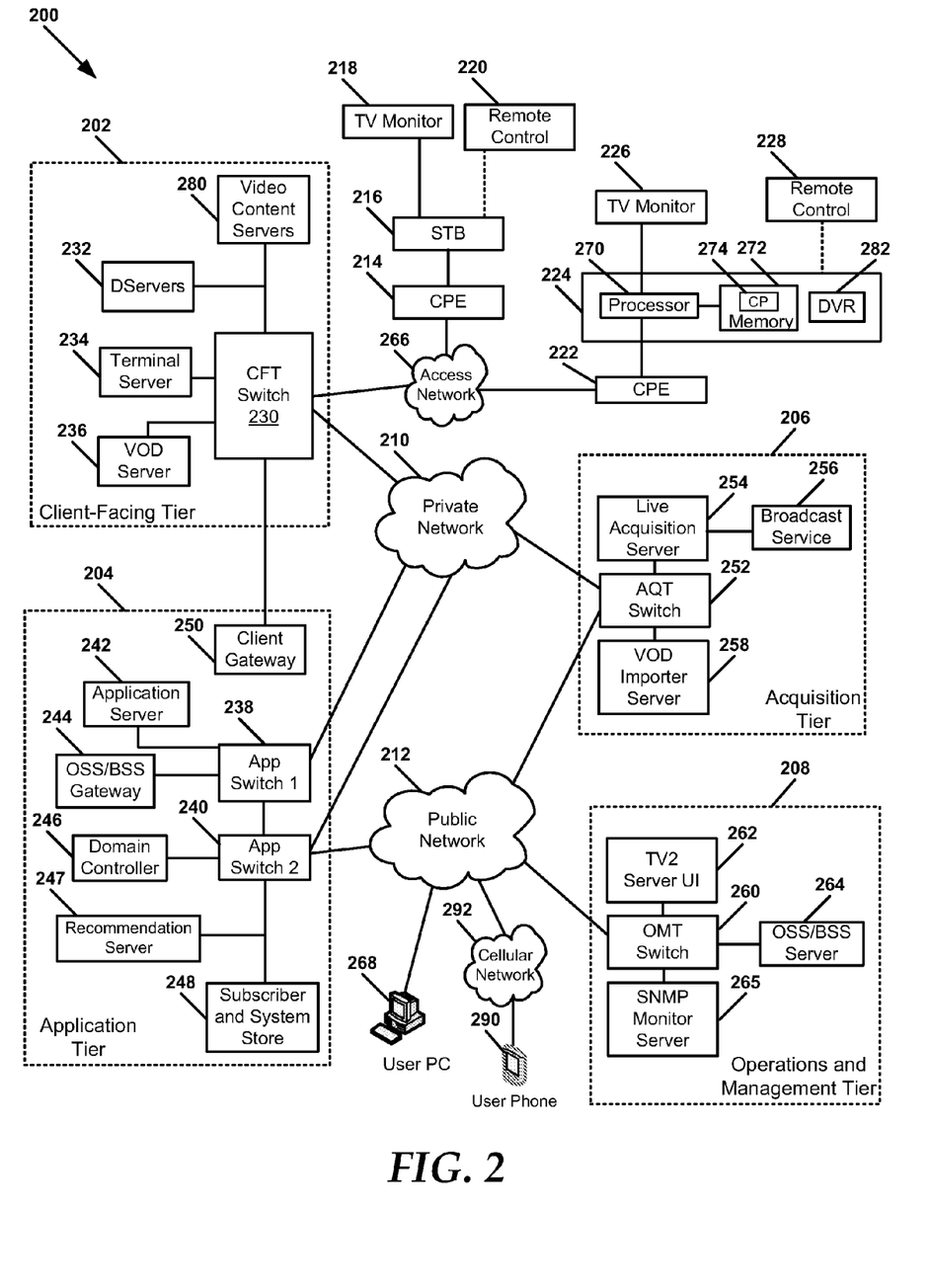
FIG. 2 is a block diagram illustrating a second particular embodiment of a system to provide recommendations related to a service.

FIG. 2 shows a second particular embodiment of a system 200 to provide recommendations related to a service. The system 200 includes elements of an IPTV system having a client facing tier 202, an application tier 204, an acquisition tier 206, and an operations and management tier 208. Each tier 202, 204, 206, and 208 is coupled to a private network 210, a public network 212, or both the private network 210 and the public network 212. For example, the client-facing tier 202 can be coupled to the private network 210, while the application tier 204 can be coupled to the private network 210 and to a public network, such as the Internet. The acquisition tier 206 can also be coupled to the private network 210 and to the public network 212. Moreover, the operations and management tier 208 can be coupled to the public network 212.

The various tiers 202, 204, 206 and 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204 can communicate directly with the client-facing tier 202.

The client-facing tier 202 can communicate with user equipment via a private access network 266, such as an Internet Protocol Television (IPTV) access network. In an illustrative embodiment, customer premises equipment (CPE) such as a first CPE device 214 and a second CPE device 222 can be coupled to the private access network 266. The CPE devices 214 and 222 can include modems (e.g., digital subscriber line modems), residential gateways, routers, other devices, or any combination thereof. The client-facing tier 202 can communicate with a first representative set-top box (STB) device 216 via the first CPE device 214 and with a second representative set-top box device 224 via the second CPE device 222. The client-facing tier 202 can communicate with a large number of set-top boxes over a wide geographic area, such as a regional area, a metropolitan area, a viewing area, or any other suitable geographic area that can be supported by networking the client-facing tier 202 to numerous set-top box devices. In one embodiment, the client-facing tier 202 can be coupled to the CPE devices 214 and 222 via fiber optic cables. Alternatively, the CPE devices 214 and 222 can be digital subscriber line (DSL) modems that are coupled to one or more network nodes via twisted pairs, and the client-facing tier 202 can be coupled to the network nodes via fiber-optic cables. Each of the set-top box devices 216 and 224 can process data received from the private access network 266 via an IPTV software platform such as Microsoft® TV IPTV Edition.

The first set-top box device 216 can be coupled to a first display device 218, such as a first television monitor, and the second set-top box device 224 can be coupled to a second display device 226, such as a second television monitor. Moreover, the first set-top box device 216 can communicate with a first remote control 220, and the second set-top box device 224 can communicate with a second remote control 228. In an exemplary, non-limiting embodiment, each of the set-top box devices 216 and 224 can receive data or video from the client-facing tier 202 via the private access network 266 and render or display the data or video at the display device 218 or 226 to which it is coupled. The set-top box devices 216 and 224 may include tuners that receive and decode television programming information for transmission to the display devices 218 and 226. Further, each of the set-top box devices 216 and 224 can include processing logic and memory accessible to the processing logic, such as the STB processor 270 and the STB memory device 272. Each STB memory device may include one or more computer programs, such as the computer program 274, that are executable by the STB processing logic. In one embodiment, one or more of the set-top box devices 216 and 224 may include integrated digital video recorder (DVR) devices or components, such as the DVR 282. In other embodiments, one or more of the set-top box devices 216 and 224 can be coupled to external DVR devices.

In an illustrative embodiment, the client-facing tier 202 can include a client-facing tier (CFT) switch 230 that manages communication between the client-facing tier 202 and the private access network 266, and between the client-facing tier 202 and the private network 210. As shown, the CFT switch 230 is coupled to one or more distribution servers (D-servers) 232 that may receive and store video content, requests, other data, or any combination thereof, which is bound to and from the set-top box devices 216 and 224. The CFT switch 230 can also be coupled to a terminal server 234 that provides terminal devices with a common connection point to the private network 210. In a particular embodiment, the CFT switch 230 can also be coupled to a video-on-demand (VOD) server 236. The CFT switch 230 is also coupled to a plurality of video servers 280 that store video content that is to be distributed via the access network 266 to the set-top box devices 216 and 224. In an illustrative, non-limiting embodiment, each of the video servers 280 can be associated with one or more channels.

The application tier 204 communicates with both the private network 210 and the public network 212. In this embodiment, the application tier 204 can include a first application tier (APP) switch 238 and a second APP switch 240. The first APP switch 238 can be coupled to the second APP switch 240. The first APP switch 238 can be coupled to an application server 242 and to an OSS/BSS gateway 244. The application server 242 provides applications to the set-top box devices 216 and 224 via the private access network 266. Such applications enable the set-top box devices 216 and 224 to provide functions such as display, messaging, processing of IPTV data and VOD material, gaming functions, other functions, or any combination thereof. In a particular embodiment, the OSS/BSS gateway 244 includes operation systems and support (OSS) data, as well as billing systems and support (BSS) data.

The second APP switch 240 is coupled to a domain controller 246 that is adapted to provide web access, for example, to subscribers via the public network 212. In addition, the second APP switch 240 is coupled to a recommendation server 247 that is adapted to provide recommendations related to the IPTV service to subscribers. The second APP switch 240 can be coupled to a subscriber and system store 248 that includes account information, such as account information that is associated with users who access the system 200 via the private network 210 or the public network 212. In a particular embodiment, the application tier 204 can also include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto.

In a particular embodiment, the set-top box devices 216 and 224 can access the system via the private access network 266 using information received from the client gateway 250. The private access network 266 provides security for the private network 210. User devices can access the client gateway 250 via the private access network 266, and the client gateway 250 can allow such devices to access the private network 210 once the devices are authenticated or verified. Similarly, the client gateway 250 can prevent unauthorized devices, such as hacker computers or stolen set-top box devices, from accessing the private network 210 by denying access to these devices beyond the private access network 266.

For example, when the set-top box device 216 accesses the system 200 via the private access network 266, the client gateway 250 can verify subscriber information by communicating with the subscriber and system store 248 via the private network 210, the first APP switch 238 and the second APP switch 240. Further, the client gateway 250 can verify billing information and status by communicating with the OSS/BSS gateway 244 via the private network 210 and the first APP switch 238. The OSS/BSS gateway 244 can transmit a query across the first APP switch 238, to the second APP switch 240, and the second APP switch 240 can communicate the query across the public network 212 to the OSS/BSS server 264. After the client gateway 250 confirms subscriber and/or billing information, the client gateway 250 can allow the set-top box device 216 access to IPTV content and VOD content. If the client gateway 250 cannot verify subscriber information for the set-top box device 216, (e.g., it is connected to a different twisted pair), the client gateway 250 can deny transmissions to and from the set-top box device 216 beyond the private access network 266.

The acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives television content, for example, from a broadcast service 256. Further, the AQT switch can be coupled to a video-on-demand importer server 258 that stores television content received at the acquisition tier 206 and communicates the stored content to the client-facing tier 202 via the private network 210.

The operations and management tier 208 can include an operations and management tier (OMT) switch 260 that conducts communication between the operations and management tier 208 and the public network 212. In the illustrated embodiment, the OMT switch 260 is coupled to a TV2 server 262 that is adapted to provide a TV2 user interface to user computers 268 via the public network 212, for example. Additionally, the OMT switch 260 can be coupled to an OSS/BSS server 264 and to a simple network management protocol (SNMP) monitor 265 that monitors network devices. In a particular embodiment, the OMT switch 260 can communicate with the AQT switch 252 via the public network 212.

In an illustrative embodiment, the recommendation server 247 is adapted to determine that it is to create a personalization profile for a subscriber to an IPTV service. The recommendation server 247 can be adapted to create the personalization profile, for example, in response to the subscriber registering an account with an IPTV service provider; in response to the subscriber configuring preferences associated with the account via the user computing device 268 or the user phone 290; in response to the subscriber's first use or other use of the IPTV service via one of the set-top box devices 216, 224; in response to a subscriber request to reset or otherwise alter a current profile; or in response to another event associated with the subscriber. The recommendation server 247 is adapted to receive an identification of an individual, such as another IPTV service subscriber, a celebrity, another real person or a fictional character, and to retrieve a previously created profile associated with the identified individual. The previously created profile can be retrieved from memory at the recommendation server 247 or from another source communicating with the recommendation server 247, such as the subscriber and system store 248 or another element of the IPTV system.

Further, the recommendation server 247 is adapted to create a personalization profile associated with the subscriber and to populate the personalization profile with information included in the profile of the identified individual. Such information can include demographic information (e.g., age, income, location, etc.), personal interest information (e.g., favorite channels, favorite programming, etc.), historical information (e.g., purchasing history, television viewing history, search history, etc.), other information, or any combination thereof.

In one example, the recommendation server 247 can be adapted to provide a plurality of selectable identifications via a graphical user interface (GUI) sent to the service subscriber computing device 268, the user phone 290, or a set-top box device, such as the set-top box device 216. The recommendation server 247 can be adapted to send the GUI, or the GUI can be sent by another network element communicating with the recommendation server 247, such as the domain controller 246, a video server 280, a D-server 232, a VOD server 236, or other network element. The recommendation server 247 can be adapted to receive a selection of one of the plurality of selectable identifications and to create a personalization profile associated with the subscriber, where the created personalization profile is populated with information included in the profile of the identified individual.

The recommendation server 247 is adapted to provide one or more recommendations in response to interaction by the subscriber with the IPTV service. For example, the recommendation server 247 can be adapted to recommend video content, music content, one or more video channels, one or more music channels, or any combination thereof, when the subscriber activates a set-top box device, views an electronic program guide, selects a channel, purchases pay-per-view content, purchases VOD content, interacts with advertising content, performs another action with respect to the IPTV service, or any combination thereof.

The recommendation server 247 is adapted to generate the recommendation(s) based on the personalization profile created for the subscriber. Hence, recommendations are initially based on information obtained from the profile of the identified individual. The recommendations can be sent to the computing device 268, to the user phone 290, to the set-top box device 216 or any combination thereof. In one example, the recommendations can be sent to the same device from which the identification of the individual was received. In other embodiments, the recommendations can be sent to a different device. For instance, the identification of the individual can be received from the computing device 268 (e.g., while the subscriber configures an IPTV service account via a web portal provided by the domain controller 246), whereas the recommendations can be sent to the set-top box device 216 while the subscriber is receiving video content via the IPTV access network 266.

In addition, the recommendation server 247 is adapted to update the personalization profile based on at least one activity of the subscriber with respect to the IPTV service. For instance, the recommendation server 247 can be adapted to update the personalization profile of an IPTV service subscriber based on a channel, video content, music content, pay-per view content, VOD content, or any combination thereof, that is viewed, not viewed, selected, not selected, purchased, not purchased, related to a search query, or any combination thereof, via the set-top box device 216. The recommendation server 247 is adapted to generate one or more second recommendations for the subscriber based on the updated personalization profile. The recommendation server 247 is adapted to provide additional recommendations based on further updates to the personalization profile.

Figure 3:
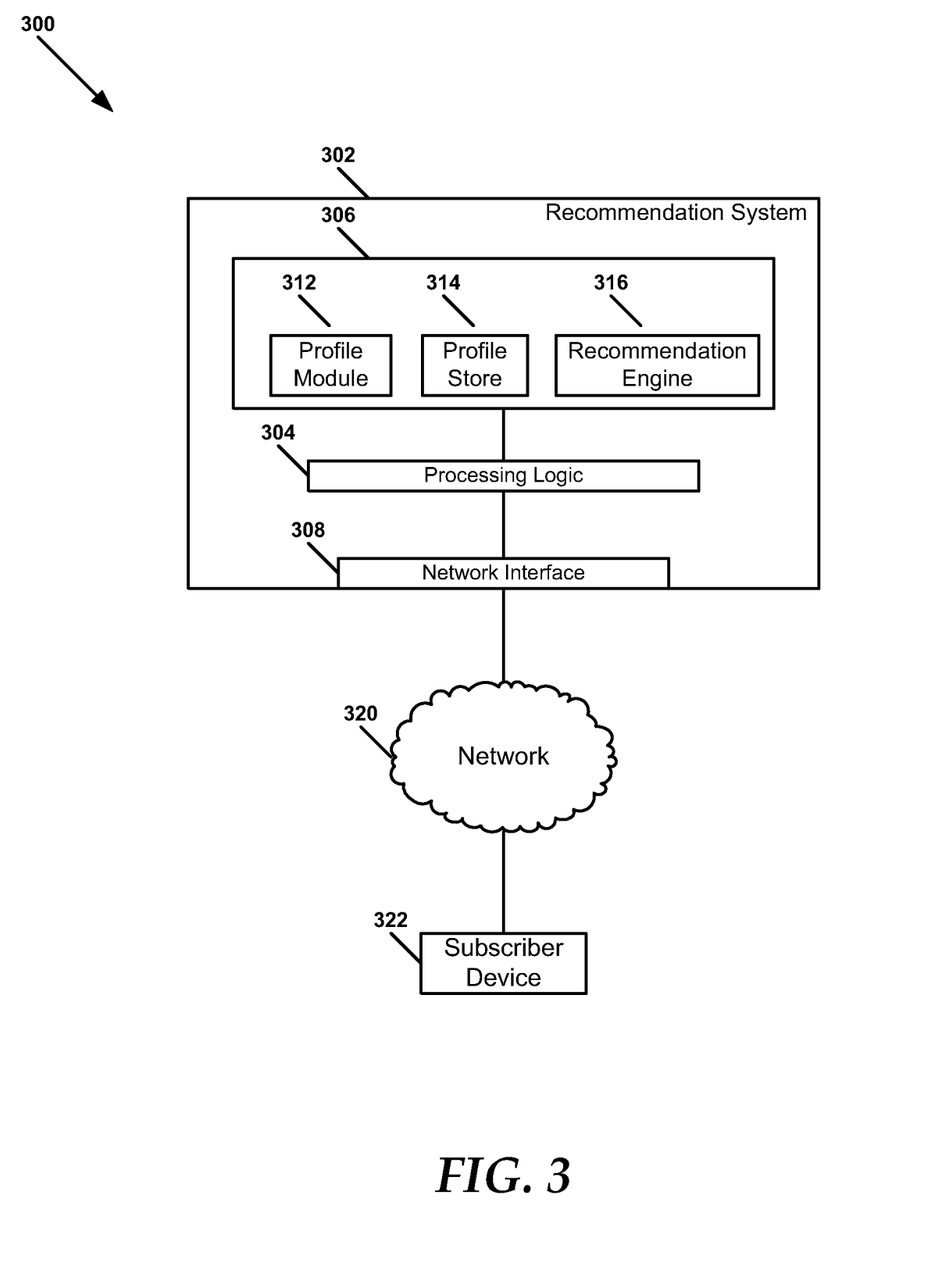
FIG. 3 is a block diagram illustrating a third particular embodiment of a system to provide recommendations related to a service.

FIG. 3 shows a third particular embodiment of a system 300 to provide recommendations related to a service. The system 300 includes a recommendation system 302 that communicates with a subscriber device 322 associated with a service subscriber via a network 320. The recommendation system 302 can include a recommendation server that communicates with other systems or network elements associated with a service provider, such as a television service provider or online service provider. In other embodiments, the recommendation system 302 is incorporated with another system or network element. For example, the recommendation system 302, or elements thereof, can be incorporated with a video server of a television service provider or with a web server of an online service provider.

The subscriber device 322 can be a computing device, set-top box device or wireless device associated with a service subscriber. The recommendation system 302 can communicate with multiple subscriber devices of different types via one or more networks including the network 320. Examples of such networks include the Internet; television access networks, such as cable, satellite and Internet Protocol Television (IPTV) access networks; cellular networks, Wi-Fi networks, or other wireless networks; or any combination thereof.

The recommendation system 302 includes processing logic 304 and memory 306 accessible to the processing logic 304. In addition, the recommendation system 302 can include at least one network interface, such as the network interface 308, adapted to facilitate communication between the recommendation system 302 and networks, such as the network 320. In a particular embodiment, the memory 306 includes a plurality of modules 312-316. The modules 312-316 can include computer instructions that are readable and executable by the processing logic 304 to implement various functions of the recommendation system 302 with respect to providing recommendations related to a service. For example, the modules 312-316 can represent various aspects of one or more software applications, operating systems, or other computer programs. In other embodiments, the modules 312-316 can be implemented as hardware logic or a combination of hardware logic and computer instructions.

The memory 306 includes a profile module 312 that is executable by the processing logic 304 to determine that it is to create a personalization profile for a subscriber to a service. For instance, the profile module 312 can be executable by the processing logic 304 to create the personalization profile in response to the subscriber registering an account with a service provider; in response to the subscriber configuring preferences associated with the account via the subscriber device 322; in response to the subscriber's use of the service via the subscriber device 322; in response to a subscriber request to reset or otherwise alter a current profile; or in response to another event associated with the subscriber.

The profile module 312 is also executable by the processing logic 304 to receive an identification of an individual, such as another IPTV service subscriber, a celebrity, another real person or a fictional character. The identification can be received from the subscriber device 322 or from another network element communicating with the recommendation system, such as a web server that provides an online site associated with an online service to the subscriber device 322. The profile module 312 is executable by the processing logic 304 to retrieve a profile associated with the identified individual from the profile store 314 or from an external source.

Further, the profile module 312 is executable by the processing logic 304 to create a personalization profile associated with the subscriber and to populate the personalization profile with information included in the profile of the identified individual. Such information can include demographic information (e.g., age, income, location, etc.), personal interest information (e.g., favorite channels, favorite programming, etc.), historical information (e.g., purchasing history, television viewing history, search history, etc.), other information, or any combination thereof. In one embodiment, the profile module 312 is executable by the processing logic 304 to provide a plurality of selectable identifications via a graphical user interface (GUI) at the subscriber device 322. The profile module 312 can be executable by the processing logic 304 to receive a selection of one of the plurality of selectable identifications and to create a personalization profile associated with the subscriber, where the created personalization profile is populated with information included in the profile of the identified individual.

In addition, the profile module 312 is executable by the processing logic 304 to update the personalization profile based on at least one activity of the subscriber with respect to the service. For instance, the profile module 312 is executable by the processing logic 304 to update the personalization profile based on historical information related to subscriber activity with respect to the service. In an illustrative embodiment, the personalization profile of an online retail service subscriber can be updated based on subscriber interaction with an online retail site via the subscriber device 322 or another subscriber device, such as a selection of a product, non-selection of a product, purchase of a product, non-purchase of a product, search query, or other subscriber activity.

The memory 306 also includes a recommendation engine 318 that is executable by the processing logic 304 to provide one or more recommendations. For example, the recommendation engine 316 can be executable by the processing logic 304 to recommend video content, music content, one or more video channels, one or more music channels, or any combination thereof, to the subscriber when the subscriber activates a set-top box device, views an electronic program guide, selects a channel, purchases pay-per-view content, purchases VOD content, interacts with advertising content, performs another action with respect to a television service, or any combination thereof. In another example, the recommendation engine 316 can be executable by the processing logic 304 to recommend one or more products when the subscriber visits an online retail site, views a product at the site, selects a product at the site, purchases a product at the site, searches for a product at the site, or any combination thereof.

The recommendation engine 316 is executable by the processing logic 304 to generate the recommendation(s) based on the personalization profile of the subscriber. Hence, at least one first recommendation is initially based on information obtained from the profile of the identified individual, whereas at least one other recommendation can be based on an updated personalization profile of the subscriber. The recommendations can be sent to the subscriber device 322.

Figure 4:
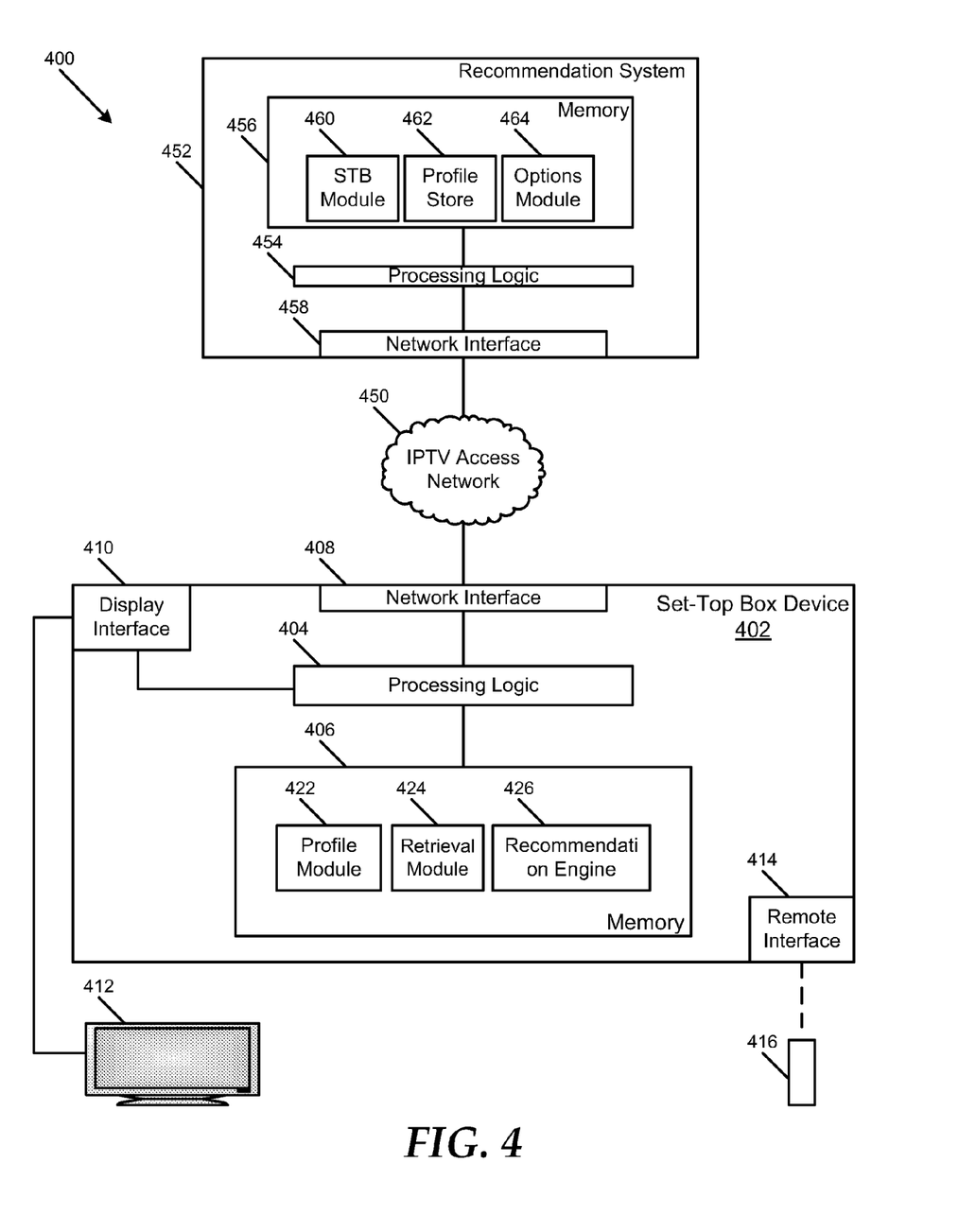
FIG. 4 is a block diagram illustrating a fourth particular embodiment of a system to provide recommendations related to a service.

FIG. 4 shows a fourth particular embodiment of a system 400 to provide recommendations related to a service. The system 400 includes a set-top box device 402 that communicates with a recommendation system 452 via an Internet Protocol Television (IPTV) access network 450. The set-top box device 402 includes processing logic 404 and memory 406 accessible to the processing logic 404. In addition, the set-top box device 402 can include a network interface 408 that is adapted to facilitate communication between the set-top box device 402 and the IPTV access network 450. The set-top box device 402 can also include a display interface 410 coupled to a display device 412, such as a television monitor, and a remote interface 414 adapted to communicate with a remote control device 416.

In a particular embodiment, the memory 406 includes a plurality of modules 422-426. The modules 422-426 can include computer instructions that are readable and executable by the processing logic 404 to implement various functions of the set-top box device 402 with respect to providing recommendations related to a service. For example, the modules 422-426 can represent various aspects of one or more software applications, operating systems, or other computer programs. In other embodiments, the modules 422-426 can be implemented as hardware logic or a combination of hardware logic and computer instructions.

The memory 406 includes a profile module 422 that is executable by the processing logic 404 to determine that it is to create a personalization profile for an IPTV service subscriber associated with the set-top box device 402. For instance, the profile module 422 can be executable by the processing logic 404 to create the personalization profile in response to the subscriber activating the set-top box device (e.g., initial activation or subsequent powering on), using an IPTV service via the set-top box device 402; or in response to another event associated with the subscriber.

The profile module 422 is also executable by the processing logic 404 to receive an identification of an individual, such as another IPTV service subscriber, a celebrity, another real person or a fictional character. The identification can be received via the remote control device 416, for example. In one example, the profile module 422 is executable by the processing logic 404 to provide a plurality of selectable identifications via a graphical user interface (GUI) displayed at the display device 412, and to receive a selection of one of the plurality of selectable identifications via the GUI. The profile module 422 is executable by the processing logic 404 to create a personalization profile associated with the subscriber, where the created personalization profile is populated with information included in the profile of the identified individual. In one embodiment, the memory 406 includes a retrieval module 424 that is executable by the processing logic 404 to retrieve a profile associated with the identified individual from the recommendation system 452.

In addition, the profile module 422 is executable by the processing logic 404 to update the personalization profile based on at least one activity of the subscriber with respect to the IPTV service. For instance, the profile module 422 can be executable by the processing logic 404 to update the personalization profile of the subscriber based on a channel, video content, music content, pay-per view content, VOD content, or any combination thereof, that is viewed, not viewed, selected, not selected, purchased, not purchased, searched, or any combination thereof, via the set-top box device 402.

The memory 406 also includes a recommendation engine 426 that is executable by the processing logic 404 to provide one or more recommendations. For example, the recommendation engine 426 can be executable by the processing logic 404 to recommend video content, music content, one or more video channels, one or more music channels, or any combination thereof, to the subscriber when the subscriber activates the set-top box device 402, views an electronic program guide, selects a channel, purchases pay-per-view content, purchases VOD content, interacts with advertising content, performs another action with respect to a television service, or any combination thereof.

The recommendation engine 426 is executable by the processing logic 404 to generate the recommendation(s) based on the personalization profile of the subscriber. Hence, at least one first recommendation is initially based on information obtained from the profile of the identified individual, whereas at least one other recommendation can be based on an updated personalization profile of the subscriber. In one embodiment, the retrieval module 424 can be executable by the processing logic 404 to retrieve data from the recommendation system 452 indicating channels, content, advertising, other options, or any combination thereof, which are available to be recommended and to select recommendations from such options based on the subscriber profile. The recommendations can be displayed at the display device 412 alone or together with other content.

The recommendation system 452 includes processing logic 404 and memory 406 accessible to the processing logic 404. In addition, the recommendation system 452 can include a network interface 458 that is adapted to facilitate communication between the recommendation system 452 and the IPTV access network 450. In a particular embodiment, the memory 456 includes a plurality of modules 460-464. The modules 460-464 can include computer instructions that are readable and executable by the processing logic 454 to implement various functions of the recommendation system 452 with respect to providing recommendations related to a service. For example, the modules 460-464 can represent various aspects of one or more software applications, operating systems, or other computer programs. In other embodiments, the modules 460-464 can be implemented as hardware logic or a combination of hardware logic and computer instructions.

The memory 456 includes a set-top box device (STB) module 460 that is executable by the processing logic 454 to receive requests from the set-top box device 402 for profiles of identified individuals, media that may be recommended, or a combination thereof, and to send data to the set-top box device 402 in response to such requests.

The memory 456 includes a profile store 462 to store profiles of IPTV service subscribers, celebrities, other real persons, fictional characters, or any combination thereof. Such profiles may be retrieved by the set-top box device 402 when creating a new personalization profile. In addition, the memory 456 includes an options module 464 to store data indicating channels, content, advertising, other options, or any combination thereof, which are available to be recommended to a subscriber. Such data may be retrieved by the set-top box device 402 before generating one or more recommendations for a subscriber.

Figure 5:
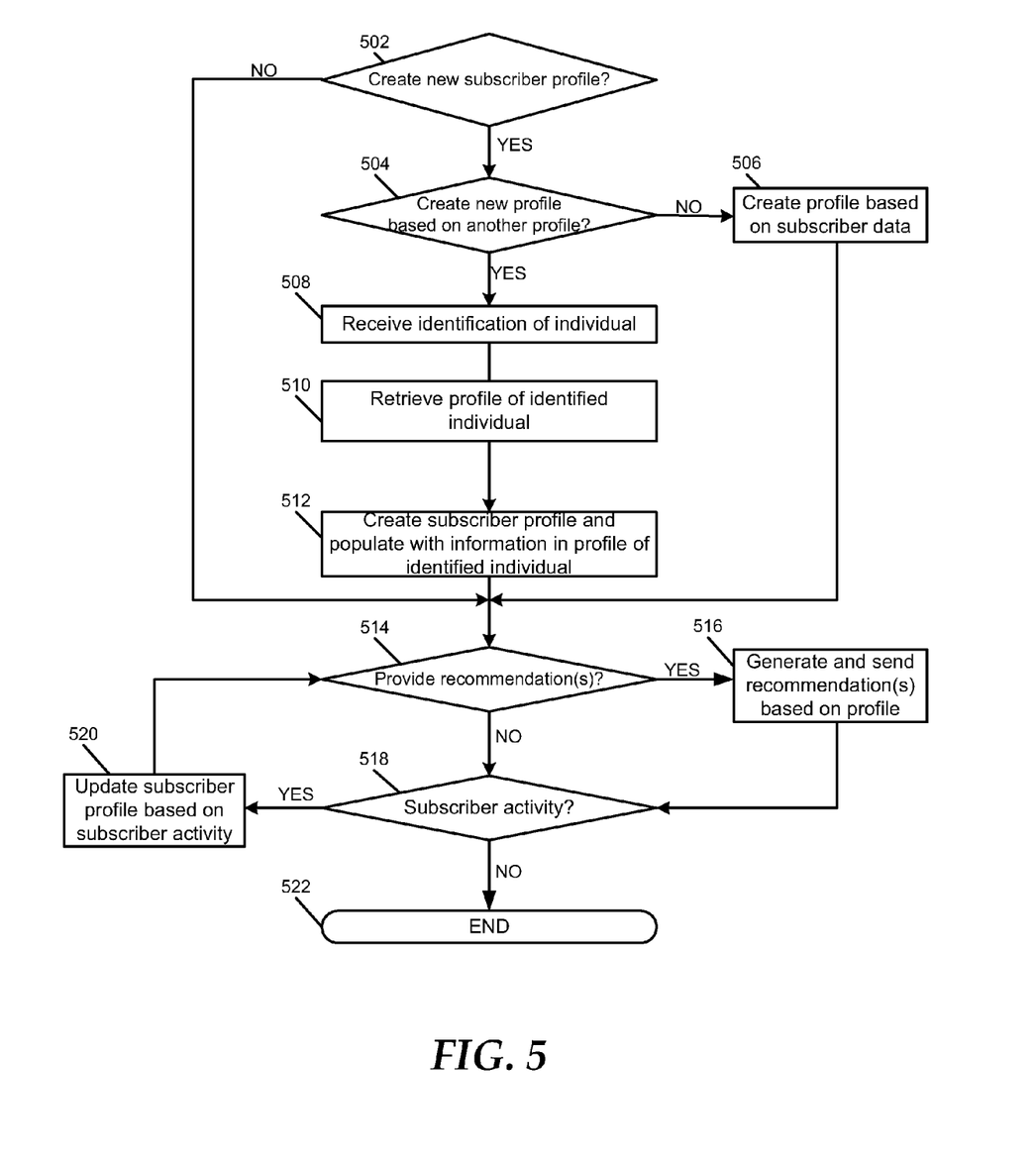
FIG. 5 is a flow diagram illustrating a particular embodiment of a method of providing recommendations related to a service.

FIG. 5 shows a particular embodiment of a method of providing recommendations related to a service. At decision node 502, a recommendation system determines whether it is to create a personalization profile for a service subscriber. For instance, the recommendation system can determine that a personalization profile is to be created for a subscriber to a video content service (e.g., cable, satellite, Internet Protocol Television), a financial service, an online retail service, an online subscription service, an online movie rental service, an online dating service, a digital music service, or any combination thereof. In one embodiment, the personalization profile can be created after the subscriber registers with a service provider or when the subscriber accesses a service provider system via a set-top box device, wireless device or other computing device that communicates with the service provider system via a video content access network, the Internet, or another network.

If the recommendation server determines that it is not to create a new profile (e.g., where a profile already exists for the subscriber), the method can proceed to decision node 514. Conversely, if the recommendation server determines that it is to create a new profile, the method continues to decision node 504, and the recommendation server determines whether it is to create the new profile based on another profile, such as a profile previously created for another subscriber, a celebrity or another real person or fictional character. If the recommendation server determines that the new profile is not to be created based on another profile, the method can move to block 506, and the profile can be created based on subscriber data, such as responses to questions used to build the profile. The method then proceeds to decision node 514.

On the other hand, if the recommendation server determines that the new profile is to be created based on another profile, the method moves to block 508, and the recommendation server receives an identification of an individual associated with the other profile. In an illustrative embodiment, the recommendation server can provide a plurality of identifications via a graphical user interface (GUI) displayed at a computing device associated with the subscriber, and the recommendation server can receive data indicating a selection of one of the plurality of identifications.

Continuing to block 510, the recommendation server retrieves a personalization profile of the identified individual. The recommendation server can retrieve the personalization profile from memory or from a database or other source external to the recommendation server. Advancing to block 512, the recommendation server creates a new personalization profile associated with the service subscriber and populates the new personalization profile with information included in the personalization profile of the identified individual.

At decision node 514, the recommendation server determines whether it is provide one or more recommendations. For example, the recommendation system can be adapted to provide one or more recommendations in response to a selection, non-selection, purchase or non-purchase of a product, a subscription, a music selection, another offering, or any combination thereof, via an online site. In another embodiment, the recommendation system can be adapted to provide one or more recommendations in response to a selection or non-selection of a video content or music channel, a purchase or non-purchase of pay-per-view content, or any combination thereof, made via a set-top box device.

If the recommendation server is to provide one or more recommendations, the method moves to block 516, and the recommendation server generates one or more recommendations based on the subscriber profile created at block 512 and sends the recommendation(s) to a computing device associated with the subscriber. The recommendation(s) can be sent to the computing device from which the selection, non-selection, purchase, non-purchase, or combination thereof, was received, or to another computing device. For instance, the recommendation(s) can be sent to a set-top box device from which a channel selection is received at a video head-end of a video content service provider. Alternatively, the recommendation(s) can be sent to a wireless device after a selection, non-selection, purchase, or non-purchase is received at an online site from another computing device.

Proceeding to decision node 518, the recommendation server determines whether it has received data indicating subscriber activity, such as what is viewed, not viewed, selected, not selected, purchased, not purchased, searched for, or any combination thereof, via one or more subscriber devices. If the recommendation server determines that it has received data indicating that there has been such activity, the method advances to block 520, and the recommendation server updates the subscriber profile based on the subscriber activity. For example, the recommendation system can update personal interest information included in the profile, based on the subscriber activity. In one embodiment, the personalization profile can be updated after each subscriber activity. In other embodiments, the personalization profile can be updated periodically, if subscriber activity has occurred during a period of time. The method terminates at 522.

Figure 6:
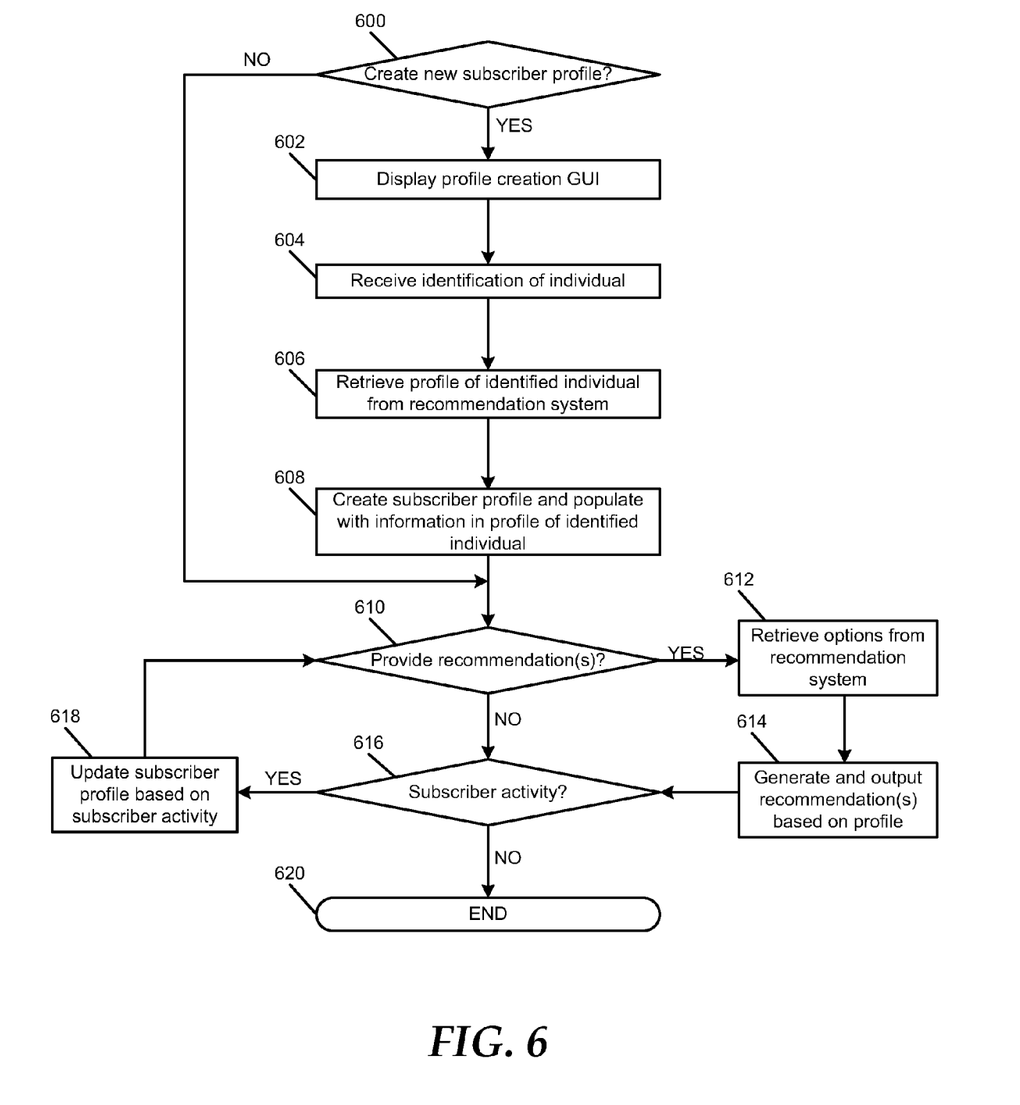
FIG. 6 is a flow diagram illustrating a second particular embodiment of a method of providing recommendations related to a service.

FIG. 6 shows a second particular embodiment of a method of providing recommendations related to a service. At decision node 600, a subscriber device, such as a computing device, a wireless device, or a set-top box device, determines whether it is to create a personalization profile for a service subscriber. For instance, the subscriber device can determine that a personalization profile is to be created for a subscriber to a video content service (e.g., cable, satellite, Internet Protocol Television), a financial service, an online retail service, an online subscription service, an online movie rental service, an online dating service, a digital music service, or any combination thereof. In one embodiment, the personalization profile can be created after the subscriber registers with a service provider or when the subscriber accesses a service provider system via the subscriber device.

If the subscriber device determines that it is not to create a new profile, the method can proceed to decision node 610. Conversely, if the subscriber device determines that it is to create a new profile, the method moves to block 602, and the subscriber device displays a profile creation graphical user interface (GUI). Proceeding to block 604, the subscriber device receives an identification of an individual. In one embodiment, the GUI can include selectable indicators of one or more individuals, and the subscriber device can receive a selection of an individual via the GUI. Continuing to block 606, the subscriber device retrieves a profile of the identified individual from a recommendation system. Advancing to block 608, the subscriber device creates a personalization profile associated with the subscriber and populates the personalization profile with information included in the profile of the identified individual.

At decision node 610, the subscriber device determines whether it is provide one or more recommendations. If the subscriber device is to provide one or more recommendations, the method moves to block 612, and the subscriber device retrieves data indicating options that can be recommended to the subscriber from the recommendation system. Proceeding to block 614, the subscriber device generates one or more recommendations based on the subscriber profile created at block 608 and outputs the recommendation(s) via a display or other output method (e.g., printing).

Proceeding to decision node 616, the subscriber device determines whether it has detected subscriber activity, such as what is viewed, not viewed, selected, not selected, purchased, not purchased, searched for, or any combination thereof, via one or more subscriber devices. If the subscriber device determines that it has detected such activity, the method advances to block 618, and the recommendation server updates the subscriber profile based on the subscriber activity. For example, the recommendation system can update personal interest information included in the profile, based on the subscriber activity. In one embodiment, the personalization profile can be updated after each subscriber activity. In other embodiments, the personalization profile can be updated periodically, if subscriber activity has occurred during a period of time. The method terminates at 620.

In some embodiments, the methods disclosed herein can be performed as described with reference to FIGS. 5-6. In other embodiments, aspects of the methods can be performed in alternative sequences or simultaneously.

Figure 7:
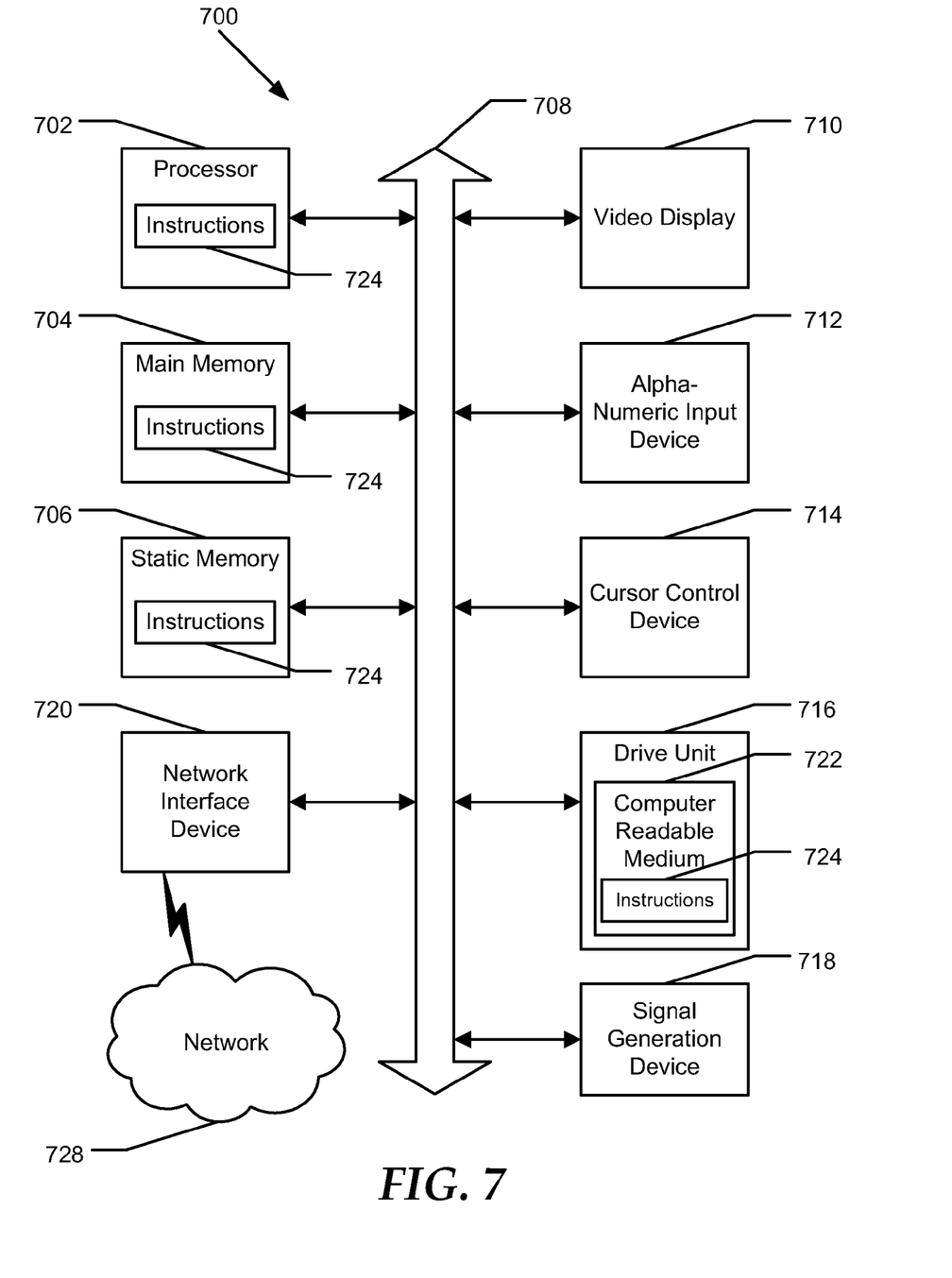
FIG. 7 is a block diagram illustrating an illustrative embodiment of a general computer system.

FIG. 7 shows an illustrative embodiment of a general computer 700 including a set of instructions that can be executed to cause the computer system to perform any one or more of the methods or computer based functions disclosed herein. The computer system 700 may operate as a standalone device or may be connected, e.g., using a network, to other computer systems or peripheral devices. In an illustrative embodiment, such standalone and peripheral devices can include, for example, set-top box devices, wireless devices, computing devices, recommendation systems, other network elements, other subscriber devices, or any combination thereof, as illustrated in FIGS. 1-4.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of providing recommendations related to a service, the method comprising:
    receiving data at a recommendation system from a first device associated with a service subscriber, the data identifying an individual, wherein the data identifying the individual is received while the service subscriber configures an account associated with the service, wherein the identified individual is a fictional character;
    creating, by utilizing a processor that executes instructions stored in memory, a personalization profile associated with the service subscriber, wherein the personalization profile is created in response to an activation of the first device, wherein the personalization profile is populated with information included in a profile of the identified individual, wherein the information included in the profile of the identified individual includes demographic information;

providing a first recommendation to a second device associated with the service subscriber based on the created personalization profile of the service subscriber and in response to the second device being activated, the service subscriber viewing an electronic program guide, the service subscriber interacting with an advertisement on the second device, and the service subscriber configuring preferences associated with the account, wherein the second device is different than the first device; and providing a second recommendation based on actions of the service subscriber on the first device when the service subscriber visits an online retail site, wherein the actions comprise viewing a product at the online retail site, selecting the product at the online retail site, purchasing the product at the online retail site, and searching for the product at the online retail site, wherein the first and second recommendations comprise a recommended financial offering and recommended video content, wherein the recommended financial offering is recommended to the service subscriber when the service subscriber invests in a financial offering with a financial service provider.

2. The method of claim 1, further comprising updating the personalization profile of the service subscriber based on historical data related to an activity of the service subscriber after creation of the personalization profile.

3. The method of claim 2, further comprising providing the second recommendation based on the updated personalization profile.

4. The method of claim 2, wherein the personalization profile is updated based on one of what is viewed, not viewed, selected, not selected, purchased, not purchased, searched for, and any combination thereof, via the first device.

5. The method of claim 1, wherein the identified individual is another service subscriber.

6. The method of claim 1, wherein the identified individual is a celebrity.

7. The method of claim 1, further comprising providing a plurality of selectable identifications of individuals at the device associated with service subscriber, wherein the data received from the device is a selection of one of the plurality of selectable identifications.

8. The method of claim 1, wherein the first and second recommendations consist of, recommended music content, a recommended video channel, a recommended music channel, recommended digital music selection, a recommended movie rental offering, a recommended television program, a recommended pay-per-view offering, a recommended video-on-demand offering, a recommended product, a recommended subscription.

9. A system to provide recommendations related to a service, the system comprising:
 a memory that stores instructions;
 a recommendation system including a processor that executes the instructions to perform operations, comprising:
  receiving data from a first device associated with a service subscriber, the data identifying an individual, wherein the data identifying the individual is received while the service subscriber configures an account associated with the service, wherein the identified individual is a fictional character;
  creating a first personalization profile associated with the service subscriber in response to a first use of the service by the service subscriber; and
  creating a second personalization profile associated with the service subscriber in response to an activation of the first device, wherein the first personalization profile is populated with information included in a profile of the identified individual; and
 a recommendation engine that performs operations comprising:
  providing a first recommendation related to a service based on the first personalization profile of the service subscriber in response to a second device being activated, the service subscriber viewing an electronic program guide, the service subscriber interacting with an advertisement on the second device, and the service subscriber configuring preferences associated with the account, wherein the second device is different than the first device, and
  providing a second recommendation based on actions of the service subscriber on the first device when the service subscriber visits an online retail site, wherein the actions comprise viewing a product at the online retail site, selecting the product at the online retail site, purchasing the product at the online retail site, and searching for the product at the online retail site, wherein the first and second recommendations comprise a recommended financial offering and recommended video content, wherein the recommended financial offering is recommended to the service subscriber when the service subscriber invests in a financial offering with a financial service provider.

10. The system of claim 9, wherein the recommendation system comprises a server communicating with an element of a service provider system.

11. The system of claim 9, wherein the first device associated with the service subscriber is selected from a group consisting of a personal computing device, a set-top box device, and a wireless phone device.

12. The system of claim 9, wherein the recommendation system sends data indicating the recommendation to the second device and to a third device associated with the service subscriber.

13. The system of claim 12, wherein the recommendation system communicates with the second device and the third device, via one of a wide area network, an internet protocol television access network, a wireless telephone network, and any combination thereof.

14. The system of claim 9, wherein the first and second recommendations consist of a digital music service, a movie rental service, a television content provider service, an online retail service, an online subscription service, and an online matchmaking service.

15. A system to provide recommendations related to a service, the system comprising:
 a device including:
  an interface that receives data from a service subscriber, the data identifying an individual, wherein the data identifying the individual is received while the service subscriber configures an account associated with the service, wherein the identified individual is a fictional character;
  a network interface that communicates with a recommendation system via a network;
  a memory that stores instructions;
  a processor that executes the instructions to perform operations, comprising:
   retrieving a plurality of options available to be recommended from the recommendation system; and
   creating a personalization profile associated with the service subscriber in response to an activation of the device, wherein the personalization profile is populated with information included in a profile of the identified individual; and a recommendation engine that determines a recommendation from the plurality of options available to be recommended received from the recommendation system related to a service based on the personalization profile of the service subscriber and based on an action of the service subscriber when the service subscriber visits an online retail site, wherein the action is selected from a group consisting of viewing the product at the online retail site, selecting the product at the online retail site, purchasing the product at the online retail site, and searching for the product at the online retail site, and wherein the interface outputs data indicating the recommendation, and provides the recommendation in response to a second device being activated, in response to the service subscriber viewing an electronic program guide, and the service subscriber configuring preferences associated with the account, wherein the recommendation includes a recommended financial offering and recommended video content, wherein the recommended financial offering is recommended to the service subscriber when the service subscriber invests in a financial offering with a financial service provider.

16. The system of claim 15, wherein the device is selected from a group consisting of a set-top box device, a personal computing device, and a wireless phone device.

17. The system of claim 15, wherein the device includes a network interface that communicates with a recommendation system via a network and wherein the processor retrieves the profile of the identified individual from the recommendation system.

18. A machine readable storage device including processor-readable instructions that are executable by a processor to perform operations, comprising:

receiving data from a device associated with a service subscriber, the data identifying an individual, wherein the data identifying the individual is received while the service subscriber configures an account associated with the service, wherein the identified individual is a fictional character;

creating a personalization profile associated with the service subscriber in response to an activation of the device and in response to a first use of the service by the service subscriber, wherein the personalization profile is populated with information included in a profile of the identified individual;

detecting an activity from a first device of the service subscriber; and providing a first recommendation to a second device of the service subscriber based on the personalization profile of the service subscriber, based on the activity of the first device, and in response to a second device being activated, the service subscriber viewing an electronic program guide, the service subscriber interacting with an advertisement on the second device, and the service subscriber configuring preferences associated with the account wherein the second device is different than the first device, and providing a second recommendation based on an action of the service subscriber on the first device when the service subscriber visits an online retail site, wherein the action is selected from a group consisting of viewing a product at the online retail site, selecting the product at the online retail site, purchasing the product at the online retail site, and searching for the product at the online retail site, wherein the first and second recommendations comprise a recommended financial offering and recommended video content, wherein the recommended financial offering is recommended to the service subscriber when the service subscriber invests in a financial offering with a financial service provider.

19. The machine readable storage device of claim 18, wherein the identified individual is a real person.

20. The machine readable storage device of claim 18, wherein the operations further comprise providing a graphical user interface to a device associated with the service subscriber.

21. The machine readable storage device of claim 20, wherein the data is received via the graphical user interface, wherein the first recommendation is displayed via the graphical user interface.

22. The machine readable storage device of claim 21, wherein the graphical user interface comprises a webpage.

23. The machine readable storage device of claim 21, wherein the graphical user interface is displayed via a display device coupled to a set-top box device.

* * * * *